(12) United States Patent
Smith

(10) Patent No.: US 6,318,488 B1
(45) Date of Patent: Nov. 20, 2001

(54) FLUID LEVITATED CASTER INTEGRATING BRAKE OR BRAKE WITH GUIDE WHEEL COMBINATION

(76) Inventor: Jason L. Smith, 2053 Grant Rd., #109, Los Altos, CA (US) 94024

( * ) Notice: Subject to any disclaimer, the term of this patent is extended or adjusted under 35 U.S.C. 154(b) by 0 days.

(21) Appl. No.: 09/528,649

(22) Filed: Mar. 20, 2000

(51) Int. Cl.[7] .................................................... B60V 1/14
(52) U.S. Cl. ........................................ 180/119; 180/125
(58) Field of Search .................................. 180/119, 124, 180/125, 128, 116

(56) References Cited

U.S. PATENT DOCUMENTS

| 3,390,736 | * | 7/1968 | Thomas | 180/119 |
|---|---|---|---|---|
| 3,586,118 | | 6/1971 | Bertin | 180/119 |
| 3,592,285 | | 7/1971 | Noble | 180/124 |
| 3,595,336 | | 7/1971 | Perez | 180/128 |
| 3,610,364 | | 10/1971 | Snoeyenbos | 180/124 |
| 3,752,331 | | 8/1973 | Colburn | 214/1 A |
| 3,796,279 | * | 3/1974 | Burdick et al. | 180/124 |
| 3,807,035 | * | 4/1974 | Moorman et al. | 180/125 |
| 3,825,093 | * | 7/1974 | Burdick et al. | 180/119 |
| 3,825,094 | * | 7/1974 | Burdick | 180/125 |
| 3,829,116 | | 8/1974 | Burdick | 280/43.23 |
| 3,891,048 | * | 6/1975 | Burdick | 180/119 |
| 4,019,698 | | 4/1977 | Earl | 244/110 A |
| 4,068,606 | | 1/1978 | Veldhuizen | 114/67 A |
| 4,427,086 | | 1/1984 | Coiselet | 180/119 |
| 5,967,666 | | 10/1999 | Johnson | 384/12 |

* cited by examiner

*Primary Examiner*—Robert J. Oberleitner
*Assistant Examiner*—Mariano Sy
(74) *Attorney, Agent, or Firm*—Paul Hentzel

(57) ABSTRACT

An assembly (72) including a brake (70), or a brake with guide wheel (69) combination centrally integrated within a levitating fluid caster. Assembly (72) levitates heavy loads upon a near frictionless pressurized fluid, and also controls stopping or guiding movement of loads.

6 Claims, 4 Drawing Sheets

FLUID LEVITATED CASTER INTEGRATING BRAKE OR BRAKE WITH GUIDE WHEEL COMBINATION

BACKGROUND

1. Field of Invention

This invention applies to the industry concerned with guidance and propulsion of heavy loads from place to place about a floor in an industry where loads levitate upon a pressurized fluid caster during transport. More particularly, this invention integrates within the caster plenum cavity a brake or a brake with guide wheel combination A different industry disclosed inventions with a discrete brake assembly or a discrete brake with guide wheel combination assembly within a ground effect trunk. A represintative invention in this art includes that disclosed in U.S. patent Ser. No. 3,592,285 granted to Noble Jul. 13, 1971. This industry is different from the fluid caster industry of this invention. These ground effect vehicles such as amphibious boats or airplanes do not levitate upon fluid casters. They levitate instead by an air foil trunk formed an enormous flexible skirt surrounding the periphery of the vehicle.

2. Description of Prior Art

In the fluid caster industry of my invention, a load, not a vehicle, levitates near frictionless upon multiple fluid casters attached beneath the load. It often takes surprisingly low forces to move the levitated load. On flat floors, relatively smaller loads move by an operator pushing or pulling the load by band. Heavier loads often propel by a motorized transporter. A problem is not so much in getting load to move, but to stop its inertia safely and quickly once it gets moving, especially down a slight grade. Prior fluid caster art inventions have somewhat solved the stopping problem by attaching a brake assembly to the bottom of load separate from the fluid caster. Such invention is similar to that disclosed in U.S. patent Ser. No. 3,752,331 granted to Colburn Aug. 14, 1973. Also, it is most difficult to guide load in a direction of motion desired by the operator. Even the slightest uneven floor condition can cause the load to swing or drift laterally. Prior art inventions have somewhat solved the guiding problem by attaching a guide wheel assembly to the bottom of load separate from the fluid caster. Such invention is similar to that disclosed in U.S. Pat. No. 3,829,116 granted to Burdick Aug. 13, 1974. Another prior art invention has combined the fluid levitated caster with a guide wheel attached within the caster plenum. This invention integrating fluid caster with guide wheel was disclosed in U.S. Pat. No. 3,390,736 granted to Thomas Jun. 28, 1966. Another novel load guiding and stopping invention is disclosed in the copending U.S. Pat. application of Jason L. Smith, Ser. No. 09/528,652, filed Mar. 20, 2000, entitled 'Guide Wheel Integrated with Ground Rubbing Brake Controls Fluid Levitated Loads'. It is assigned to the same assignee as the present application. This invention somewhat solves the stopping and guiding problems simultaneously by attaching an assembly to load bottom that integrates both the brake and guide wheel functions together in one assembly.

Both the brake separate assembly and sate brake with guide wheel combination assembly are expensive. Both assemblies take significant effort to attach to load often including drilling and tapping of holes and bolt and nut fastening. Both assemblies may be impossible to attach directly under load as often there is minimal available space that is unoccupied either by fluid caster devices or some other load structural feature.

My invention has the advantages over systems using conventional fluid casters with separate brake assembly, and/or with separate guide wheel assembly of:

i. lowering the cost of adding a brake function or adding a guide wheel with brake function to a fluid caster levitated system ii. decreasing the weight of added brake function or added guide wheel with brake function to a fluid caster levitated system iii. reducing set up time and attachment complexity of adding brake function or added guide wheel with brake function to a fluid caster levitated system iv. decreasing attachment footprint area of adding brake function or added guide wheel with brake function to a fluid caster levitated system.

SUMMARY OF THE INVENTION

My invention integrates a fluid caster and a brake or a fluid caster and a brake with guide wheel combination into a single assembly. This invention results in a unique device that not only levitates a heavy load for transporting, but can also stop or guide load. Many unexpected advantages result from the combined invention of fluid caster and brake, or fluid caster and brake with guide wheel combination.

Prior art total transport systems typically use separate fluid casters, and separate brake. My invention is not larger in physical size than that of prior art fluid casters alone performing similar levitation. Therefore, the total transport system attachment area using my invention is much less than prior art transport systems.

The weight of my invention is far less than a comparable prior art caster, plus a separate brake assembly.

My invention has an advantage of requiring many fewer parts than a comparable prior art caster, plus a separate brake assembly.

My invention has an advantage of costing far less than a prior art comparable caster, plus a separate brake assembly. An unexpected advantage of my invention is that it can be attached to transported load far easier. It requires a much reduced size footprint area. It requires many fewer holes and bolt connections than prior art casters, with separate brake assemblies, or with separate brake with guide wheel combination assemblies.

By way of example, my invention is illustrated herein by the accompanying drawing, wherein:

DRAWING FIGURES

DESCRIPTION OF THE PREFERRED EMBODIMENTS

1. The Invention Preferred Piston Actuator Embodiment in General

Figure 1:
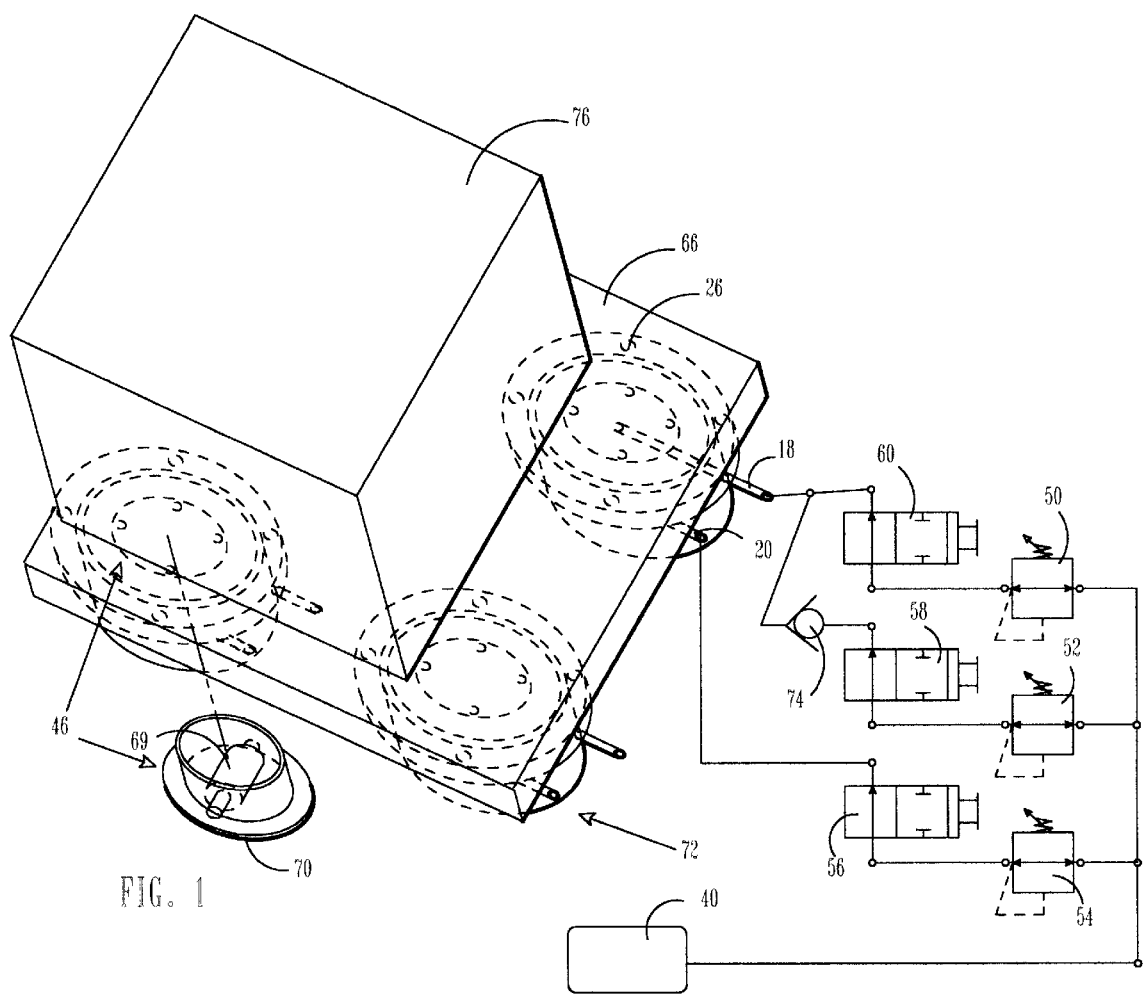
FIG. 1 is perspective view of a several fluid casters with integrated brake and wheel shown interconnected to a load base including symbolically represented fluid power controls.
Figure 6:
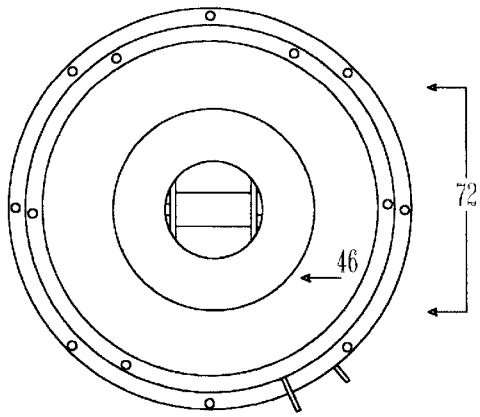
FIG. 6 shows a bottom plan view of the assembly of FIGS. 2–5.

The view of FIG. 1 shows three assemblies of my invention 'fluid levitated caster integrating brake or brake with guide wheel combination' referred to as numeral 72. Assemblies 72 attach to a heavy load 76 that moves upon a load base 66 structure. Load base 66 levitates just above a floor via pressurized fluid plenums created beneath assemblies 72. Assemblies 72 have affixed a tube 20 that conveys pressurized fluid to the plenum cavity. A facility pressurized fluid source 40, such as an air compressor or pressurized tank, plumbs to a levitation pressure regulator 54. Regulator 54 output plumbs to a levitation valve 56. The output from valve 56 conveys using flexible hose to levitation tube 20. Assembly 72 would typically boll to the bottom of load base 66 via bolts extending though mounting holes 26. Beneath one of the assemblies 72, is shown an exploded view details of a brake 70 and a guide wheel 69. Assembly 72 has affixed another tube 18 that conveys pressurized fluid during actuation of either the braking function or the wheel guiding function. The view of FIG. 6 shows a bottom planar view of assembly 72. A center subassembly, referred to as numeral 46, includes both the brake and the guide wheel functions integrated together.

2. Pressurized Modes of Operation

Assembly 72, shown in FIG. 1 view, includes several modes of operation depending upon pressures applied to tubes 18 and/or 20. One mode occurs when load base 66 levitates off the floor as p fluid flows into tube 20. The fluid bearing levitation principles and details are well known to those skilled in the art In this levitation only mode, shown best in FIG. 3, while levitated, brake 70 and guide wheel 69 are both raised off a floor. Floor is identified in FIG. 3 as a line, and is referenced as numeral 68. This mode occurs when no pressurized fluid enters tube 18. In another mode, shown in FIG. 4, guide wheel 69 on forces to floor 68 by low pressurization conveyed to tube 18. At a final mode, shown in FIG. 5 view, brake 70 forces to floor 68 by high pressurization conveyed to tube 18.

Figure 3:
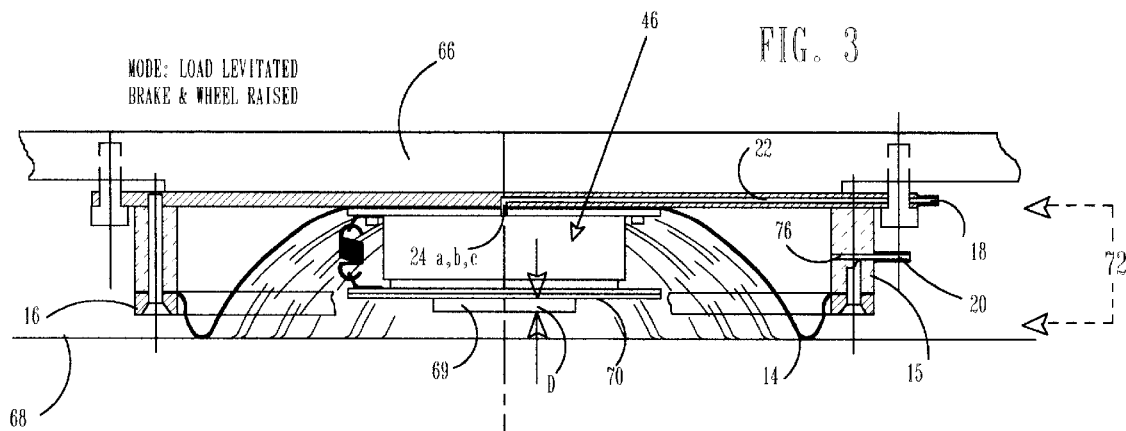
FIG. 3 shows a fragmentary sectional elevation view taken as suggested by lines 3—3 of FIG. 2 as load is levitated, guide wheel is and brake is raised.
Figure 4:
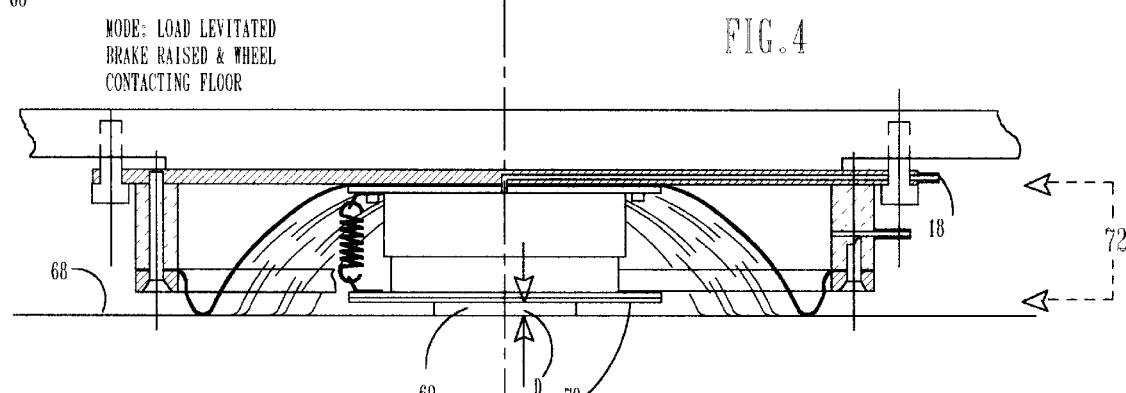
FIG. 4 shows a fragmentary sectional elevation view taken as suggested by lines 3—3 of FIG. 2 as load is levitated, brake is raised, and guide wheel is forced to floor.
Figure 5:
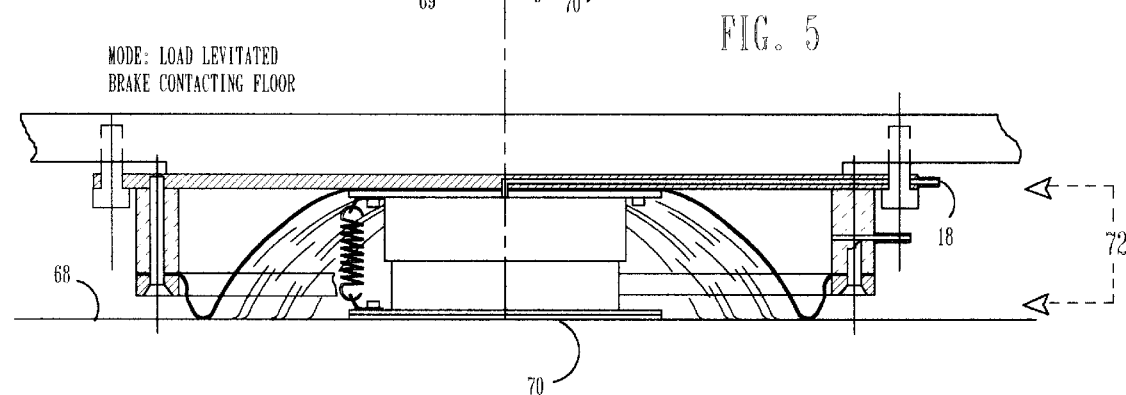
FIG. 5 shows a fragmentary sectional elevation view taken as suggested by lines 3—3 of FIG. 2 as load is levitated, and brake is forced to floor.

The mode of operation shown in FIG. 3 view is useful when neither brake function nor guide wheel function is desired. This mode is selected when load base is being rotated or s to a new direction of motion. The other pressurized modes shown in views of FIGS. 4 and 5 are evoked by operator as they manipulate a wheel valve 58 or a brake valve 60 of FIG. 1 view. These modes of operation are useful when either load guidance or stopping are desirable. Details of the operation of valves 58 and 60 will be presented next.

3. Fluid Controls

Fluid controls shown in FIG. 1 are not part of my invention 72. However a description of their functioning would help in understanding assembly 72 operation. Facility pressurized fluid supply 40 plumbs to a wheel regulator 52 and to a brake regulator 50. Wheel regulator 52 adjusts to a pressure corresponding to downward force desired on wheel 69. Brake regulator 50 adjusts to a pressure corresponding to downward force desired on brake 70. Subassembly 'brake integrated with guide wheel' 46 of FIG. 3 operation necessitates that wheel regulator 52 pressure be set less than the pressure of brake regulator 50. The reason for its lower pressure setting will become apparent soon. Low pressure applied to tube 18 forces only wheel 69 to floor 68 whereas high pressure forces brake 70 to floor 68.

The output fluid from wheel regulator 52 and brake regulator 50 plumbs to wheel valve 58 and brake valve 60 respectively. Fluid exiting valve 58 plumbs through a check valve 74. Check valve 74 is oriented to prevent higher brake regulator 50 pressure from ever bleeding through the self relieving feature of wheel regulator 52. The fluid exiting valves 74 and 60 plumb together and connects with flexible hose to tube 18. When wheel valve 58 opens, a low pressurization reaches assembly 72 and subassembly 46, and wheel 69 forces against floor 68. When one or more guide wheels of a transporter system are in forced contact with a floor, they constrain a load to move in a direction perpendicular to wheel axle. If more than one guide wheel is used in a transporter system, they all orient in the same direction. Referring to the view of FIG. 1, when brake valve 60 opens, a high pressure present via brake regulator 50 conveys to assembly 72 and subassembly 46. The high pressure forces brake 70 to floor 68 stopping load base 66.

4. Invention Construction Detail

Figure 2:
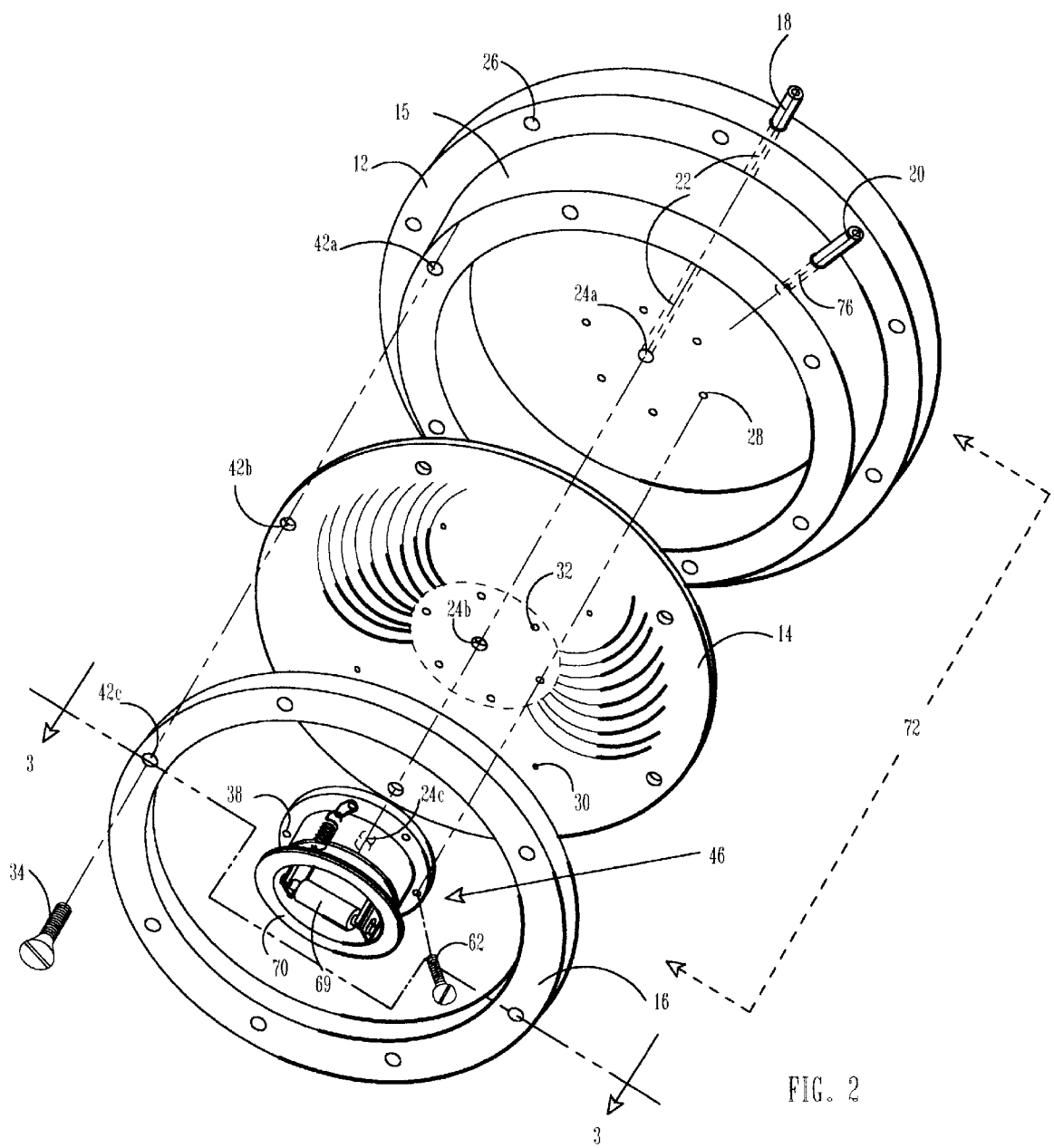
FIG. 2 is a perspective exploded view of fluid caster with integrated brake and wheel alone showing more detail.

More details of my invention 72 operation and construction show in the view of FIG. 2. A ring shaped cylinder 15 attaches without leakage to a disk shaped flange 12 defining a cavity within cylinder 15. An array of mounting holes 26 extends through flange 12 exterior to cylinder 15. Holes 26 facilitate bolting assembly 72 to load base 66. Flange 12 shown in the view of FIG. 2 includes within its thickness a radial fluid passage 22 extending from the periphery to the center point At this center point, a port 24a conveys one end of passage 22 to cylinder 15 cavity. The outer end of passage 22 has attached, without leakage, tube 18. An annular shaped ring 16, matching cylinder 15 diameters, includes a series of bolt holes 42c that match similar tapped holes 42a extending partially through cylinder 15 length. A flexible diaphragm 14 element sandwiches between cylinder 15 and ring 16 with bolts 34 forming a leakproof seal. Diaphragm 14 includes a matching series of bolt holes 42b accommodating clearance for bolts 34. Diaphragm 14 is made from thin, medium hardness, polyurethane material which provides gasket sealing, abrasion resistance, and flexibility properties. The center point of diaphragm 14 includes a fluid port 24b through which pressurized fluid can pass as it enters subassembly 46.

Internal to cylinder 15 cavity and partially through flange 12 is another array of tapped bolt holes 28. A matching bolt hole array 32 perforates diaphragm 14. Brake with integrated guide wheel subassembly 46 includes a matching bolt pattern 38, and attaches via bolts 62 to tapped holes 28 within flange 12. Diaphragm 14 sandwiches between flange 12 and subassembly 46 forming a leak proof seal.

A radial passage 76 perforates through cylinder 15 wall. Tube 20 attaches to the outside end of passage 76 without lee. Fluid pressure entering tube 20 will pressurize flange 12 side of diaphragm 14 forcing it outward. Flexible diaphragm 14 balloons under pressure tending to form a bulbous shape.

FIG. 3 views show a cross section of diaphragm 14 taken by section line 3—3 of FIG. 2 at its ballooned or pressurized state. The outside surface of diaphragm 14, nearest ring 16, contacts floor 68 over which load base 66 moves. The floor contact area shape with diaphragm 14 is much like a narrow annular ring. The views of FIGS. 3, 4, 5 all show assembly 72 as pressurized fluid conveys to tube 20, through passage 76, ballooning diaphragm 14, downward to floor 68. Pressure within diaphragm 14 inscribed by the floor contact ring, pushes against floor 68. This pushing force levitates the entire assembly 72 including load base 66 and load off floor 68. A few orifices 30 shown in the view of FIG. 2 perforate diaphragm 14. Orifices 30 allow just enough pressurized fluid to escape to "lubricate" the floor contact ring of diaphragm 14. The lubricating fluid under floor contact ring lifts diaphragm 14 surface off floor 68 a minute distance, in the magnitude of one or two one-thousands of an inch. The escaped fluid lubrication particulars are well known to those skilled in the art and are disclosed in related inventions.

Referring again to the view of FIG. 2, subassembly 46 includes an inner fluid port 24c. Pressurized fluid entering tube 18 flows through passage 22, through ports 24a, b, c and into subassembly 46; thereby forcing either guide wheel 69 or brake 70 against floor 68. Low pressure actuates guide wheel 69 only and high pressure actuates brake 70. The lowermost surface of brake 70 is offset a distance shown as distance D from the lowermost wheel 69 cylindrical surface in the views of FIGS. 3, 4. In this manner, wheel 69 can guide load base 66 while brake 70 is not in floor contact. The view of FIG. 4 shows guide wheel 69 forced to floor 68 while brake 70 is offset from floor 68 by distance D. As tube 18 receives a greater pressurization, wheel 69 reaction forces with floor 68 pushes against a compressive spring. As wheel 69 reaction force builds, wheel 69 facts distance D to brake 70 surface. When wheel 69 retracts distance D, brake 70 will contact and push onto floor 68 and stop load base 66.

The view of FIG. 5 shows brake 70 in forced contact with floor 68, and with guide wheel 69 retracted within brake 70 surface. More details of subassembly 46 operation can be found in the copending U.S. application Ser. No. 09/528,652 described above of Jason L. Smith entitled 'Guide Wheel Integrated with Ground Rubbing Brake Controls Fluid Levitated Loads'.

Referring to the view of FIG. 2, preferred materials for cylinder 15, ring 16, flange 12, tubes 18 and 20, and basic structure materials for subassembly 46, are strong rigid materials such as metal, plastic, composite fiber. The preferred material is aluminum or steel because it is strong, easily joined and castable. Permanent joining of tubes 18 and 20, flange 12, cylinder 15 can be accomplished with welding, casting, brazing, silver soldering, and adhesives. These suggested materials and design configurations are those that work well with this invention. Other embodiments, however, using different materials and design configurations are included within the scope of this invention.

5. Alternate Embodiment
   Basic Shape

Figure 7:
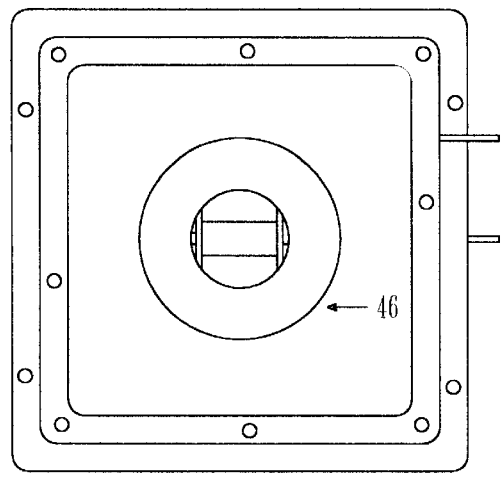
FIG. 7 shows a bottom plan view of a square shaped alternative embodiment of the assembly of FIG. 6.

Alternate embodiments of my invention can include other basic shapes such as a rectangular caster structural shape as that shown in the view of FIG. 7. The subassembly 46 of this rectangular embodiment can be the same subassembly 46 of the view of FIG. 6.

6. Alternate Embodiment
   Brake Only

An alternative embodiment of my invention not shown can include a similar subassembly 46 to that shown in FIG. 2 except guide wheel 69 is omitted. This embodiment is useful if the operator wishes to only stop load base 66 being transported and is not concerned with guiding load base 66.

7. Alternate Embodiment
   Air Bag Actuator

Figure 8:
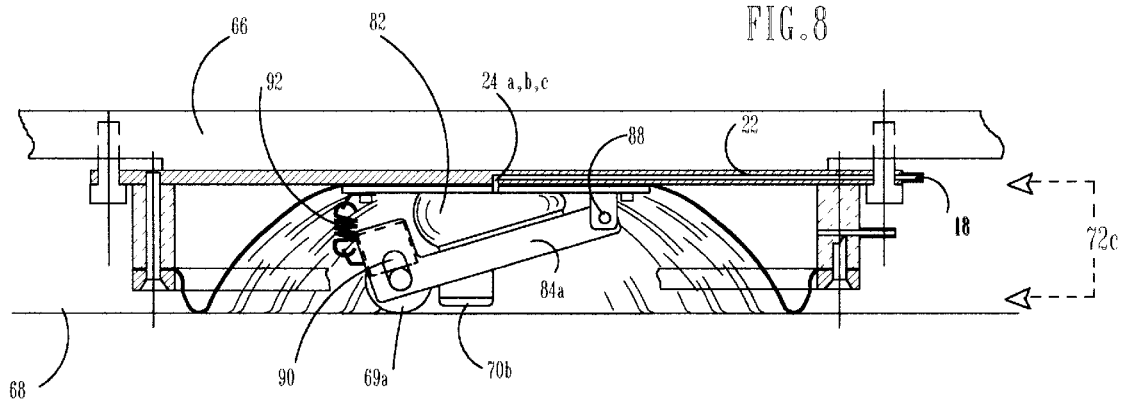
FIG. 8 shows an air bag alternative embodiment fragmentary sectional elevation view of the assembly of FIG. 4.
Figure 9:
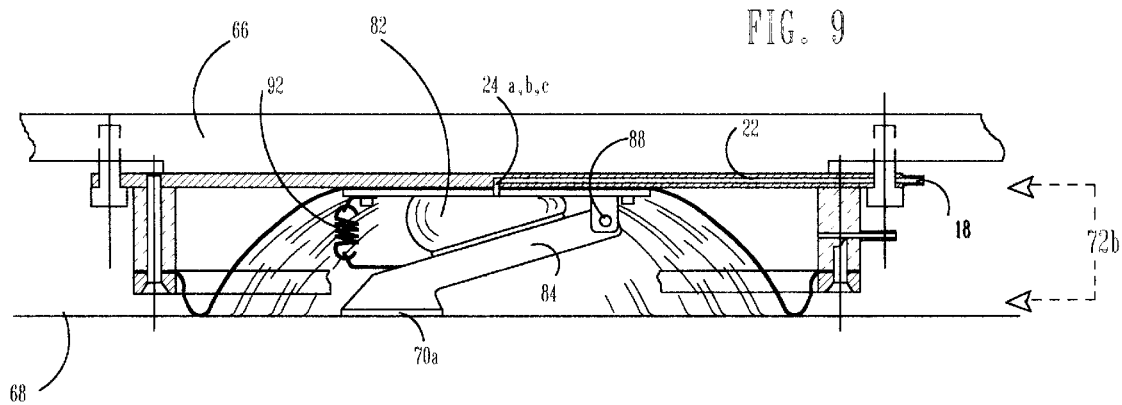
FIG. 9 shows an air bag alternative embodiment of the assembly of FIGS. 3, 4, or 5 with brake only.

Another alternative embodiment of my invention 72b shows in FIG. 9 and includes an integrated pressurized fluid bag actuated brake subassembly. With this subassembly, load base 66 stops by a brake 70 that attaches to a pivotal arm 84. Arm 84 rotatably attaches to pivot 88. Air bag 82 positions above arm 84 and is brake 70a forcing element of this design. As process fluid enters tube 18, it conveys trough passage 22, ports 24a, b, c and into air bag 82. As air bag 82 inflates, it forcibly rotates arm 84 about pivot 88 pushing brake 70a against floor 68. As fluid pressure within tube 18 returns toward atmospheric, brake 70a and arm 84 lifts off floor 68 by a return spring 92. Another alternative embodiment of my invention shows in the view of FIG. 8, and is referred to as numeral 72c. This embodiment includes an integrated fluid bag actuated subassembly disclosed in the U.S. Pat. Application mentioned above by Jason L. Smith. This invention is called 'Guide Wheel Integrated with Ground Rubbing Brake Controls Fluid Levitated Loads'. In this assembly 72c, load base 66 stops with a brake 70b or guides with a wheel 69a. Both brake 70b and wheel 69a attach to a pivotal arm 84a. Arm 84a rotateably attaches to pivot 88. An air bag 82 positions above arm 84 and is the forcing element of this design. Pressurized fluid conveys to tube 18, and plumbs through passage 22, ports 24a, b, c and into air bag 82. As air bag 82 inflates, with low pressure, it forcibly rotates arm 84 about pivot 88 and pushes wheel 69a only against floor 68. As higher pressurized fluid enters tube 18, air bag 82 inflates with greater force, and pushes harder on arm 84. As rotating arm 84 forces harder toward floor 68, wheel 69a axle retracts within a slot in arm 84a. Retracting wheel 69a pushes against a compressive spring pad 9. As wheel 69a-retracts, brake 70b forces contact with floor 68 stopping load base 66. As fluid pressure within tube 18 returns toward atmospheric, brake 70b, and wheel 69b lifts off floor 68 by a return spring 92.

For purposes of exemplification, particular embodiments of the invention have been shown and described to the best understanding thereof. However, other embodiments can include other brake or brake with guide wheel combination assembly integrations with a fluid caster, irrespective of particular structure, materials, and plumbing without departing from the spirit and scope of the claimed invention.

What is claimed is:

1. A fluid levitated caster translating device for stopping and guiding movement along a ground surface thereunder, comprising:
   (a) a load-supporting frame,
   (b) a fluid-levitated-caster means attached to said load-supporting frame, including a plenum cavity adapted to receive flow of fluid at super atmospheric pressure and cooperable with said ground surface to derive fluidic levitating support for said load-supporting frame,
   (c) a brake attached within said plenum cavity,
   (d) a brake attachment frame mounting said brake within said plenum cavity in cooperation with said ground surface so as to afford readily stoppable movement characteristics to the device,
   (e) a brake variable-yieldable bias means between said brake attachment frame and said load-supporting frame, producing variable force therebetween to yieldably urge said brake into anti-slip frictional engagement with said ground surface,
   (f) a guide wheel attached within said plenum cavity,
   (g) a guide wheel attachment means mounting said guide wheel on said brake attachment frame for rotation about a horizontal axis and cooperation with the aforesaid ground surface so as to afford readily guidable non-side-slip movement characteristics to the device,
   (h) a compressive separating means between said brake attachment frame and said guide wheel attachment means, so when said brake variable-yieldable bias means force is low, said guide wheel only contacts said ground surface; and as brake variable-yieldable bias means force is high, brake also contacts said ground surface.

2. The fluid levitated caster translating device of claim 1, wherein said brake variable-yieldable bias means is in the form of an expandable fluid bag availed of fluid at super atmospheric pressure exceeding supply pressure therof to said fluid-levitated-caster means.

3. The fluid levitated caster translating device of claim 1, wherein said brake variable-yieldable bias means is in the form of an expandable fluid bag availed of fluid at super atmospheric pressure exceeding supply pressure therof to said fluid-levitated-caster means.

4. A fluid levitated caster translating device for stopping movement along a ground surface thereunder, comprising:

(a) a load-supporting frame, (b) a fluid-levitated-caster means attached to said load-supporting frame, including a plenum cavity adapted to receive flow of fluid at super atmospheric pressure and cooperable with said ground surface to derive fluidic levitating support for said load-supporting frame, (c) a brake attached within said plenum cavity, (d) a brake attachment frame mounting said brake within said plenum cavity in cooperation with said ground surface so as to afford readily stoppable movement characteristics to the device, (e) a yieldable bias means between said brake attachment frame and said load-supporting frame and reactive therebetween to yieldably urge said brake into anti-slip frictional engagement with said ground surface.

5. The fluid levitated caster translating device of claim 4, wherein said yieldable bias means is in the form of an expandable fluid bag availed of fluid at super atmospheric pressure exceeding supply pressure thereof to said fluid-levitated-caster means.

6. The fluid levitated caster translating device of claim 4, wherein said yieldable bias means is in the form of a piston-cylinder availed of fluid at super atmospheric pressure exceeding supply pressure thereof to said fluid-levitated-caster means.

* * * * *